July 12, 1955
G. A. DAY
2,712,831
SHOCK PRESSURE ABSORBER AND PULSATION DAMPENERS
Filed Nov. 27, 1948
2 Sheets-Sheet 1
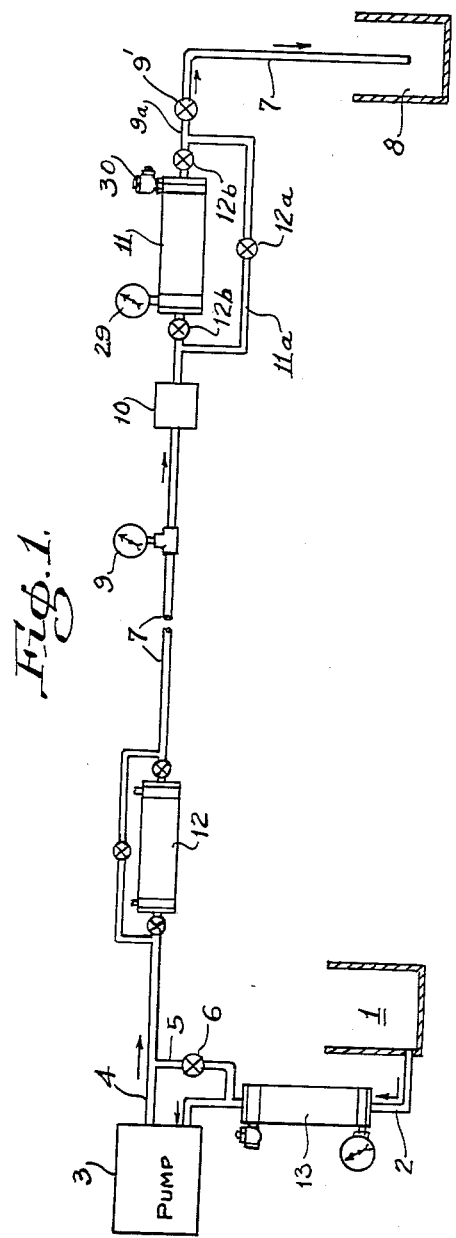
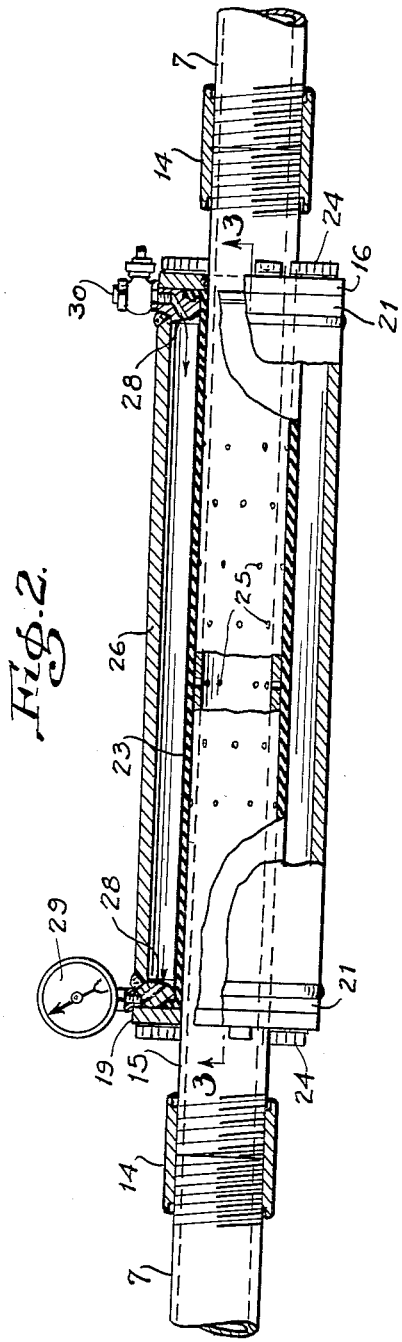
INVENTOR.
GROVER A. DAY
By Philip Subkow
ATTORNEY.

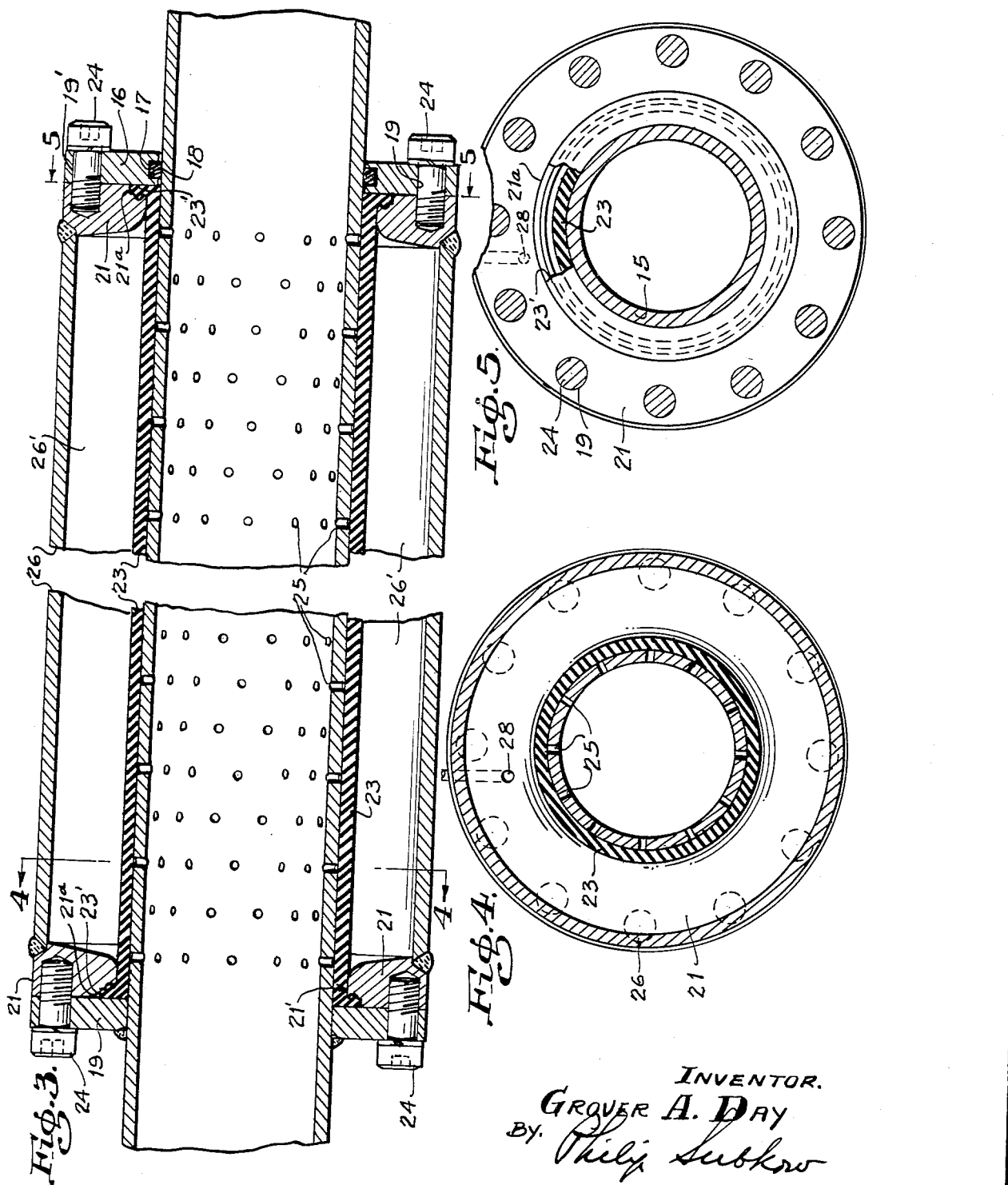

United States Patent Office 2,712,831
Patented July 12, 1955

2,712,831

SHOCK PRESSURE ABSORBER AND PULSATION DAMPERS

Grover A. Day, Long Beach, Calif.

Application November 27, 1948, Serial No. 62,281

4 Claims. (Cl. 138—26)

This invention relates to hydraulic systems and particularly to the prevention of excessive rise in pressures which occurs during the acceleration or deceleration of a fluid stream moving in pipe lines, and also for the prevention of pressure fluctuation in pipe lines employing pumps which develop pressure fluctuation at the discharge into the pipe line.

Pressure variations in hydraulic systems, in which I include systems for the flow of all fluids including gases, vapors, and liquids, may occur as a result of the use of reciprocating pumps wherein pressure cycles occur as a result of the pulsating flow of fluid. In using centrifugal pumps a like, but smaller, pressure perturbation occurs. It is conventional, especially in using reciprocating pumps, in such systems, to use accumulators to reduce the fluctuations, in order to increase the pumping efficiency of such pumps.

Pressure variations also occur when a moving stream is suddenly decelerated, as, for example, by a sudden closing of a valve in the line. When this occurs a shock pressure will develop in the form of a water hammer. The resultant shock pressure depends upon the initial velocity of the fluid in the line at said valve. Various devices are suggested in the prior art for limiting such shock pressure. They include chambers which act as accumulators which bleed excess pressure from the line.

Such devices are placed as appendages to the line with a by-pass line connecting the device and the protected line. They must be relatively large in size so as to have the volume necessary to permit the accumulation of fluid bled off without compressing the contained cushioning air to an undesirable high pressure. General practice for air cushioned accumulators, where they are employed with reciprocating pumps, is to provide a volume twenty times the piston displacement. Such units also will remove some of the shock pressure and reduce water hammer. Experience has shown that such prior art units cannot suppress shock pressure entirely and dangerous pressures are often experienced. An additional difficulty, where the hydraulic line is a liquid line, arises from the fact that the contained air above the liquid is soon removed by the liquid surging in the accumulator by solution or foaming so that the liquid level rises in the accumulator and soon fills the whole chamber, thus inactivating the unit. Frequent servicing is necessary to remove the excess liquid and the danger is present that oversight may find the unit filled with liquid when such shock pressure occurs.

In order to avoid this difficulty it has been suggested in the prior art to place a flexible parting membrane to separate the air and liquid. This, while avoiding the difficulty arising from the removal of air by liquid, has introduced an additional difficulty arising from the fact that the developed high unit stresses in the membrane cause frequent rupture and require membrane replacement and introduce the danger that the unit may become filled with liquid in the same manner as the first described air chamber units and be inactive to suppress shock pressure when shock pressure is experienced. Additionally, it has not been found possible, even when the units are at their greatest activity, to remove the shock pressure sufficiently, especially in lines where the fluid is moving at appreciable velocities.

I have devised a unit which may be introduced into the pipe line to take the full flow of the fluid through the unit or which may, if desired, be employed as an appendage connected by a pipe to the pipe line being protected. When employed to take the full flow, no special space provision need be made for the unit and this is important where space considerations are important, as is the case in almost all pipe line installations. They have the additional advantage that extra piping is not necessary to connect the unit to the system.

In employing shock pressure absorbers to protect a pipe line system from shock pressures developed when the fluid is rapidly decelerated or stopped by introduction of an obstruction to flow in a line, as, for example, by the closing of a valve, it is desirable to prevent the shock pressure from travelling from the obstruction backward to the pump, or to instruments and control instruments employed in pipe lines in order to prevent damage to such pumps or instruments or controls. This is true whether the fluid in the line is gas, vapor or liquid.

The pressure absorber of my invention is placed between the point at which the obstruction is placed in the line and that portion of the hydraulic system which is sought to be protected against shock pressure.

It has not been possible, to my knowledge, in the case of the prior art units, to remove all of the shock pressure and to prevent the propagation of the shock wave past the shock pressure absorber. As a result of extensive experimentations I have discovered that in order for a shock pressure absorber to remove such shock pressure and substantially prevent the propagation of the shock pressure beyond the absorber, it is necessary to relieve the fluid from the pipe line through a pressure relief opening whose area depends upon the velocity of the fluid passing through the pipe line at the point where the obstruction to flow is placed under the normal operating pressure conditions.

I have also found that in protecting pipe line pumping systems, wherein shock is developed by sudden deceleration of a fluid stream in that pipe line by interposition of an obstruction as described above, it is desirable to employ a relief area which bears a desirable ratio to the average cross sectional area of the pipe line wherein the pressure relief line or vent is positioned.

It is common practice to connect such accumulators to pipe lines or pumps by connecting T's. The relief area is thus, in such prior art installations, equal to or less than the average cross section pipe line to which it is connected, and, as I have found, shock pressures even at the lowest practicable velocity employed in pumping of fluids may not be entirely removed by the pressure absorber so connected.

I have discovered that the reason for the inadequacy of prior art shock pressure absorbers to remove a greater percentage or all of the developed shock pressure arises from the inadequacy of the relief area employed. I have found that the ratio of the relief area to the area of the pipe line will depend, as stated above, upon the velocity of the fluid through the line. This ratio will be greater the higher the velocity. For example, in the case of liquid systems in which the lowest practicable velocities encountered in practice are about one or two feet per second, I find that the relief area should be greater than the average cross sectional pipe area. For higher velocities in such systems (twenty feet per second is considered a high fluid velocity in commercial practice), I find that the relief area should be from about four to about twenty or more times the pipe area. I have thus found that by making the relief area large enough and greater than the area of pipe line to which the shock pressure absorber is attached, I may obtain substantially complete suppression of the shock pressure and prevent the propagation of shock pressure beyond the absorber to cause the dangerous pressure rises at the instruments, pumps, or other pipe line installation to be protected. Thus, also, I prevent the water hammer and destruction of valve fittings and the line itself. The pressures thus established in the pipe line when the obstruction is introduced is not substantially greater than the operating line pressure or any stand-by or by-pass pressure employed in the pipe line during normal operating conditions, i. e., before the obstruction is introduced into the pipe line.

In a preferred embodiment I provide the necessary relief area by making the opening between the pipe line and the absorber of the desired size. This is most conveniently done by making my absorber a part of the pipe line so as to pass the full fluid flow through the absorber during normal operating conditions. In order to vent the pressure I provide openings or relief vents in the pipe line at the absorber through which the pressure, whether shock pressure or pulsating line pressure, may be relieved, such vents having the desired cross sectional area. In order to receive the vented fluid, I provide an expandable chamber so designed as to have a flexible wall which can deflect under the pressures exerted through the relief vent to accommodate the vented fluid. The fluid exerts the full pressure of the line (both static and dynamic) during the flow of the fluid through the line at all times through the relief vents against the flexible wall.

In order for the above relief vents to be effective to suppress the propagation of the shock pressure, I have found that it is necessary to make the area of each of said openings or relief vents small. In other words, I desire that they act as throttling orifices to throttle the flow of fluid passing through the orifices into the expandable relief chamber under the shock or pulsating pressure. In fact, if such vent or vents are equal to or greater in area than the cross sectional area of the pipe line at the vent, then, as I have found, it is impossible to suppress the shock pressure completely, irrespective of what the total area of the vents may be. In other words, I have found that some, and, in fact, a substantial, throttling of the flow through the vents is necessary during the period that fluid is bled from the line as the shock pressure develops. For that reason it is desirable to have the vents in the form of orifices which should have volume discharge orifice coefficients of less than about .98 and where the orifices are not uniform in size the average volume discharge coefficient of all of said orifices should be less than .98 and more preferably between about 0.5 and about 0.9, depending on the fluid pumped and its velocity, in order that a substantial drop in pressure, i. e., throttling action, occur across the relief orifice. When employing orifices having such throttling action I make the total orifice area, i. e., the sum of the area of all orifices employed, greater than the average cross sectional area of the pipe line at the orifices and may, by adding orifices, adjust the total area to the amount necessary to prevent propagation of shock pressure at the fluid velocities occurring in such pipe line at said orifices under normal operating pipe line pressure. Thus, for example, if the total area of the above orifices is equal to or less than the average cross sectional pipe line area, at the vents, I find that I may not remove more than about 75% of the shock pressure developed at commercially useful fluid velocities. By adding an additional number of such orifices so that the sum of the areas of the relief orifices exceeds the pipe cross sectional area, I can, if sufficient orifices are employed, remove the remaining portion of the shock pressure, even when operating at the highest commercially employed fluid velocities.

I, therefore, employ more than one opening, i. e., a plurality of relief vents or orifices, each of which has a throttling effect and each of such orifices should have a cross sectional area of less than the average cross sectional area of the pipe line at which said relief orifices are placed, and the sum of the areas thereof should be larger than the average cross sectional area of the pipe at which said orifices are placed and greater the higher the fluid velocities.

The provision of the orifices also permits me to use a flexible diaphragm which may be mounted over the vents in a manner to permit the diaphragm to be deflected by the vented pressure. Since such unit, during normal operation of the fluid, is under nominal line pressure, the diaphragm may become distended by such line pressure. I have found that the life of the diaphragm, especially if it is an elastomer such as rubber, is increased if the diaphragm under line pressure is not materially stressed. In order to obtain this result, I balance the line presusre by means of a gas pressure exerted on the other side of the diaphragm. The degree of pressure employed will depend upon the elasticity of the diaphragm and need be only sufficient to hold the diaphragm in substantially unstretched condition against the orifices. I, however, hold this balancing pressure to an amount such that when no line pressure is exerted, it will not force the rubber through the orifices.

When using the unit employing a rubber or other elastomer diaphragm as a pulsation dampener, in which the gas pressure may at times exceed the line pressure, I have found it desirable to employ orifice sizes which in area are not so great as to give rise to the danger of cutting at the orifice edge by reason of the excess gas pressure. I have found that orifices equivalent or less than ¼" diameter will not, when formed in all practical pipe sizes and employed for gas balancing pressures and pipe line flow pressures used in commercial practice, result in cutting of rubber diaphragms. When using such orifices and employing the unit in hydraulic systems in which liquid is pumped I may reduce the total number of orifices to a quantity less than is required when using larger orifices, and may when using orifices which will not cut the rubber diaphragm employ relief areas of about 10 to 15 or less times the average pipe area at the orifices, and will thus have a unit which will act as a shock pressure absorber when employed in severest commercial service, for example, liquid pipe line systems in which the liquid velocity is in the order of 20 or more feet per second.

It will be observed that the orifices and the wall in which the orifices are placed prevent this balancing pressure from forcing the diaphragm into the line when pressure in the line falls below operating line pressure for any reason, thus the unit has no throttling or valve action in the pipe line system.

The provision of such balancing pressure, I have found, has the additional advantage that it reduces the deflection of the diaphragm and both the stretching thereof and the space in the balancing gas chamber which must be provided for such stretched diaphragm. When the shock pressure which is developed, as, for example, by the closing of a valve, is vented through the orifices and the diaphragm is stretched, the pump by-pass pressure, i. e., the stand-by pressure, which in pipe line systems is always higher than the operating line pressure, is generated in the line and is exerted through the orifices against the diaphragm. The diaphragm thus stretches under the influence of these pressures. The interposition of an opposing gas pressure on the other side of the diaphragm reduces the stretch of the diaphragm when shock or stand-by pressures are developed in the line when the unit acts as a shock pressure absorber, and also when the unit acts to iron out pressure perturbations when it is used as a pulsation dampener. If the pressure of the gas is equal to the by-pass or stand-by pressure or is a smaller quantity, depending upon the elasticity of the diaphragm, the diaphragm will not be deflected at all when the stand-by pressure is developed in the line and the smallest sized unit can be constructed. However, in such a unit the balancing pressure and the elasticity of the diaphragm act as stored pressure to force fluid from the chamber into the pipe line after the shock pressure is absorbed and thus tends to introduce secondary shock into the pipe line.

It has been found, however, that if the balancing pressure is limited in magnitude so that it is merely sufficient to hold the diaphragm against line pressure in unstressed condition, i. e., unstretched, the gas pressure and the deflection of the diaphragm will not be sufficient to introduce any substantial secondary shock pressure. I, therefore, desire to hold the balancing gas pressure at a value less than the by-pass pressure and preferably less than the line or operating pressure to preclude secondary shock.

I prefer, also, to make the gas chamber of such dimension that the stretched diaphragm, especially if it be of rubber, does not hit a wall of the gas chamber, in order to prevent excessive working of the rubber by impact against the wall upon the imposition of the vented pressure. This will insure a longer life to the rubber. I desire, however, to adjust the volume of the chamber, in order that it be of minimum volume, so that at the maximum distention of the diaphragm under the pressure referred to above, the rubber diaphragm just touches the wall.

This invention will be further described in connection with the drawings which show a preferred embodiment of my invention. In the drawings Fig. 1 shows a system showing the various positions of the shock pressure absorber and pulsation dampener of my invention for various services for which such pulsation dampener and shock pressure absorber may be employed according to my invention;

Fig. 2 is a view partly in section of the preferred embodiment of my invention with parts broken away for clarity;

Fig. 3 is a section taken along line 3—3 of Fig. 2;

Fig. 4 is a section taken along the line 4—4 of Fig. 3;

Fig. 5 is a section taken along the line 5—5 of Fig. 3.

The source of fluid to be pumped is shown schematically as 1, and this may be a reservoir, tank or the atmosphere or any other source of fluid, i. e., gas, vapor or liquid, to be pumped. Line 2 is the connecting source and pressure generating means for pumping the fluid, which pressure generating means may be either of the reciprocating or rotary type, such as a centrifugal pump; 4 is the discharge line from the pump 3; and 5 is the usual by-pass line employed with pumps in which is positioned the pressure regulating or relief valve 6.

As is well known the valve 6 is set to remain closed under ordinary pipe line operating conditions and will open at a predetermined pressure above the normal operating pump discharge pressure, which pressure is herein referred to as the by-pass pressure. The line 7 is shown schematically to discharge at 8, being any point of delivery of the fluid being passed through the pipe line. The valve 9' is shown schematically in the line and this may be the source of obstruction of the fluid and its deceleration; as, for example, when the valve 9' is closed to shut off the line, the fluid flowing in the line is suddenly brought to a stop. The valve 9' may also indicate for purposes of illustration any other obstruction which decelerates the fluid and brings it to a stop, for instance, a ram, in which the fluid in the line entering the ram is brought to a sudden stop when the ram is brought against its stop. This is equally true in the case of hydraulic units such as jacks, and this situation is present in the case of hydraulic presses. Therefore, 9' is intended to show schematically any device whereby the fluid flowing is suddenly brought to a stop by 9'.

The time interval in which the fluid is brought to a stop, of course, depends upon the rapidity in which the unit 9' is actuated to cause such stoppage, and this may vary from an infinitesimal time to a sensible time. The shock pressure developed is the greater the less this time interval.

The velocity of the fluid immediately before 9', i. e., at 9a, is the velocity which generates the shock pressure when the unit 9' acts to bring the fluid to a stop. This shock pressure is propagated normally back along the pipe line, if no shock pressure absorber is employed, and it may seriously damage gauges, such as shown at 9, or meters, such as shown at 10, and may even cause damage to the pump 3 or damage to the unit shown at 9', or cause rupture of the line 7.

In order to avoid such possible dangers the shock pressure absorber of my invention is introduced. It is preferable to introduce this shock absorber unit shown at 11 immediately adjacent and as close as possible to the unit 9'. The unit also may be positioned at the inlet side of the pump as is illustrated at 13. This is particularly advantageous when using reciprocating pumps in which the intake valve to the pump is periodically closed. At such times the fluid which has been in motion in the inlet line 2 creates a shock pressure against the intake valve which is thus closed off, and for that reason the shock absorber 13 should be positioned as close as possible to the intake valve. Usually the by-pass line 5 and valve 6 is built into the pump so that the shock absorber 13 can be placed as close as possible to the intake valve of the pump and act to protect the pump and the valve mechanism of the pump against such shock.

In employing the unit as a pulsation dampener it is positioned as shown at 12 as close as possible to the discharge point of the pump so that as much of the line beyond the pump is protected against perturbations in pressure. If desired each of these units may be provided with a by-pass line shown at 11a with the usual valve unit shown at 12a and 12b. In operation both valves 12b are open and valve 12a is closed.

The unit is composed of a pipe 15 which is desirably of the same diameter as the portion of the pipe shown at 9a, immediately before the device 9' which causes stoppage of the fluid and when the unit is used in the position shown at 13 it is desirably of the same cross sectional area as the cross sectional area of the intake port to the intake valve of the reciprocating pump.

Mounted at spaced intervals along the line 15 are two end plates 16 and 19, each provided with an annular bore sufficient to pass the pipe 15 and a circumferential groove 17 carrying an O-ring 18 which makes a friction fit with the outside of the pipe 15 and also carrying circumferential bores 19' to receive studs to be described later. The unit 19 need not employ the O-ring and may be welded to the pipe 15 to make a fluid tight joint. Inside and adjacent the collars 16 and 19 are plates or rings 21 which carry a central bore 21' of a diameter greater than the outside circumference of 15 by an amount equal to the thickness of the sleeve membrane 23, as will be described later. These rings are bolted to the plates 19 and 16 by bolts 24. The sleeve 23 is preferably of rubber or other elastomer such as a synthetic rubber and makes a snug fit on the pipe 15 and carries at its end flanges 23' which fit into and over grooves 21a in rings 21 so that the ends of the sleeve act as a gasket between plates 19 and the ring 21. This assures a fluid tight joint at the end of the rubber diaphragm.

Cylindrical sleeve 26 is mounted on the rings 21 and welded in place to provide a chamber 26' and which is separated by the fluid tight joint made by the rubber diaphragm 23 between the ring 21 and the plates 19 or 16. Ports 28 are bored into each of the rings 21.

One of said ports is usually provided with a gauge 29 or may be sealed with a plug and the other port 28 carries a check valve or other valve 30 whereby gas pressure may be introduced into the chamber 26 to a desired degree and held against leak by the valve 30.

Distributed along the length and intermediate the end of the tube 15 and intermediate the rings 21 are a plurality of orifices. There is thus a length of imperforate pipe at each end of the perforate area and within the rings 21. The rubber sleeve fits over the perforate and imperforate areas. Each of the orifices is proportioned in dimension, that is, made of such shape and bore or cross sectional area, as to provide for throttling of any fluid passing through said orifices and underneath the rubber diaphragm 23. As has been indicated, I prefer, when using rubber to use orifices having an area equivalent to a circular orifice of ¼" or less in diameter.

By limiting the orifice to less than the dimensions indicated the difficulties arising from cutting out of the rubber membrane by reason of any pressure exerted on 26' to force the rubber diaphragm through the orifice is obviated.

By making the orifices about 0.2 square inch or less in area I obtain a throttling orifice and can employ a reasonable number of orifices to give the desirable ratio of orifice area to pipe cross sectional area in all pipe sizes employed commercially in distribution of fluids. As stated above, by employing such orifices ¼" or less I can avoid damage to rubber diaphragms, as described above. These dimensions may be varied but should be such as to give orifices which will give a substantial throttling action and have the cross sectional area which in sum is greater than the cross sectional area of the pipe, as described above.

Orifices as described above will also give me the desirable throttling action through the orifice. The sum of the orifices employed is such that the total area of such orifices shall be larger than the cross sectional area of the pipe 15, and preferably for high velocities of fluid through the pipe 15 and through the pipe 9a it should be considerably greater than the cross sectional area of 15, to wit, from 4 to 20 times said cross sectional area when pumping liquid. It will be observed that I thus employ a plurality of orifices since in obtaining orifices which have a throttling action and whose areas add up to greater than the cross sectional area of the pipe, a plurality of orifices need to be employed.

The gas pressure introduced into chamber 26' is always less than pipe line pressure because of the fact that the elasticity of the rubber acts together with the gas pressure to hold the rubber diaphragm against the pipe 15, and the pressure is so regulated that the diaphragm 23 rests substantially unstressed against the pipe 15; in other words, the gas pressure is always preferably less than the pipe line pressure.

The operation of this unit can be visualized from the following considerations. When the unit 9, for example, if it be a valve, is shut off rapidly, the moving fluid through line 7 creates a shock pressure against the valve 9 which pressure is propagated through line 15. This pressure is then relieved through orifices 25 by throttling action of the orifices and the diaphragm 23 distends to a small degree to permit the fluid to be vented through the throttling orifices under the influence of the shock pressure and the shock pressure is then rapidly dissipated so that practically no shock pressure is transmitted through line 15 beyond the front end of the unit and toward the remaining pipe line such as meters 19, gauges 9, etc. As soon as this occurs, however, the pump, which is continuing to operate, increases the line pressure above operating line pressure and up to the pressure at which the by-pass valve 6 is set. In this case the additional fluid pumped by the pump valve also passes through the line and is relieved through the orifices 25 and may further distend the diaphragm 23.

I prefer to make the outside diameter of the sleeve 26 such that the distension of the diaphragm under either shock pressure or by-pass pressure shall not cause the diaphragm to strike against the wall of 26 with any material force. This is to prevent such working of the rubber as to shorten its life. I may obtain this effect by proportioning the diameter of the sleeve 26 and the degree of pressure which is introduced through 28, and this will therefore limit the distension of the diaphragm 23 to the degree suggested and in this manner I am able to prevent any rupturing of the diaphragm or excessive wear due to excessive working thereof. I am thus also able to reduce the volume of the chamber 26' since the lower the initial balancing gas pressure the greater will be the extension of the rubber diaphragm.

If it is found when employing such a unit that it is desirable to increase the velocity of the flow through the pipe line for any reason, to any value, such that the original installation has orifices in size and number such that the relief area is no longer sufficient to suppress such shock, it is desirable, in that case, to replace such a unit with a unit having a larger number of orifices sufficient to give the desirable ratio of the total area of orifices to the cross sectional area of said pipe for such higher velocity. This may be done either by shutting the line down and replacing the unit or by by-passing the line through by-pass 11a by the opening of the valve 12a and closing the valves 12b and the unit with the desirable distribution and number of orifices introduced in its place.

When employing such unit as a pulsation dampener it may be introduced as described above. Recognizing that these pulsations are variations in pressure above and below normal operating pressure, the excess of pressure above operating pressure is vented through the orifices 25 underneath the diaphragm 23, in which case it is desirable to use a gas pressure which is lower than line pressure. In other words, the gas pressure employed is sufficient together with the elasticity of the rubber to hold the diaphragm in substantially unstressed condition when the average operating line pressure is in line 15. If such gas pressure is employed upon the arrival of the pulse pressure above average line pressure, the distension of the diaphragm will relieve the excess line and reduce it to average line pressure, thus storing the fluid under the diaphragm at a pressure equal to average line pressure. As the pump pressure falls, the stored fluid is relieved under the gas pressure and the tension of the rubber and is displaced through the orifice back into the line to maintain substantially constant line pressure.

While I have described a particular embodiment of my invention for the purpose of illustration, it should be understood that various modifications and adaptations thereof may be made within the spirit of the invention as set forth in the appended claims.

I claim:

1. A pressure absorber for use in pipe lines, which comprises a chamber, an expansible diaphragm in said chamber dividing said chamber into a fluid pressure chamber on one side of said diaphragm, a gas pressure chamber on the other side of said diaphragm, pressure relief openings in a wall of said fluid pressure chamber adapted to provide communication between said fluid pressure chamber and said pipe line to form a pressure relief vent for said pipe line, said relief openings comprising a plurality of throttling orifices, said orifices each having an average cross sectional area of substantially 0.05 square inch or less, and each orifice being substantially less than the cross-sectional area of said pipe line, said orifices having a throttling action upon fluid flow through said orifices upon imposition of pressure perturbation in said pipe line at said relief openings.

2. A pressure absorber for use in a pipe line, which comprises a chamber, an expansible diaphragm in said chamber dividing said chamber into a fluid pressure chamber on one side of said diaphragm and a gas pressure chamber on the other side of said diaphragm, pressure relief openings in a wall of said fluid pressure chamber adapted to provide communication between said fluid pressure chamber and said pipe line to form a pressure relief vent for said pipe line, said relief openings comprising a plurality of throttling orifices, said orifices each having an average cross sectional area of substantially .2 square inch or less, and each orifice being substantially less than the cross-sectional area of said pipe line, said orifices having a throttling action upon fluid flow through said orifices upon imposition of pressure perturbation in said pipe line at said relief openings.

3. In a pipe line system, a pipe line, a pressure absorber in said line, said pressure absorber comprising a pipe, a portion of said pipe intermediate its ends being perforate, said perforations comprising a plurality of throttling orifices, each orifice having a cross-sectional area substantially less than the cross-sectional area of said pipe and each orifice having an area of substantially 0.2 square inch or less, an imperforate section on each end of said pipe adjacent the perforate section, an expansible rubber sleeve positioned over said imperforate and perforate sections, an outer chamber surrounding said expansible sleeve, a fluidtight connection between said imperforate sections and said sleeve and said sleeve and said outer chamber adjacent said imperforate sections, means to introduce and maintain gas pressure in said chamber, and a source of fluid pressure connected to one end of said pipe to maintain fluid pressure in said pipe and on one side of said rubber sleeve, said gas pressure on the other side of said sleeve being less than said pressure in said pipe.

4. The combination set forth in claim 3 wherein each orifice has an area of substantially 0.05 square inch or less.

References Cited in the file of this patent

UNITED STATES PATENTS

| | | |
|---|---|---|
| 2,046,193 | Spicer | June 30, 1936 |
| 2,278,688 | Caminez | April 7, 1942 |
| 2,290,337 | Knauth | July 21, 1942 |
| 2,429,297 | Rudolph | Oct. 21, 1947 |
| 2,448,118 | Pellettere | Aug. 31, 1948 |
| 2,495,693 | Byrd et al. | Jan. 31, 1950 |
| 2,530,190 | Carver | Nov. 14, 1950 |
| 2,583,231 | Ragland | Jan. 22, 1952 |
| 2,609,001 | Hebard | Sept. 2, 1952 |